United States Patent [19]

Jang

[11] Patent Number: 5,733,221
[45] Date of Patent: Mar. 31, 1998

[54] HYDRAULIC CONTROL SYSTEM OF AN AUTOMATIC TRANSMISSION FOR A VEHICLE

[75] Inventor: Jaeduk Jang, Kyungki-do, Rep. of Korea

[73] Assignee: Hyundai Motor Company, Rep. of Korea

[21] Appl. No.: 648,245

[22] Filed: May 15, 1996

[30] Foreign Application Priority Data

Aug. 30, 1995 [KR] Rep. of Korea ............... 95-27630

[51] Int. Cl.⁶ .............................................. F16H 61/26
[52] U.S. Cl. ...................... 477/127; 477/130; 477/131
[58] Field of Search ............................... 677/127, 130, 677/131, 150, 155

[56] References Cited

U.S. PATENT DOCUMENTS

| | | | |
|---|---|---|---|
| 5,393,273 | 2/1995 | Haka | 477/150 X |
| 5,507,706 | 4/1996 | Jang et al. | 477/130 |
| 5,537,887 | 7/1996 | Jang et al. | 477/131 X |
| 5,565,001 | 10/1996 | Sakai et al. | 477/150 X |
| 5,582,559 | 12/1996 | Jang et al. | 477/130 |
| 5,626,533 | 5/1997 | Jang | 477/150 X |

*Primary Examiner*—Khoi Q. Ta
*Attorney, Agent, or Firm*—Finnegan, Henderson, Farabow, Garrett & Dunner, L.L.P.

[57] ABSTRACT

A hydraulic control system of an automatic transmission for a vehicle comprises a pressure regulator means changing hydraulic pressure supplied from an oil pump, a torque pressure changing/supplying device changing line pressure supplied from the pressure regulator into a torque pressure and supplying it, a shift controller supplying the hydraulic pressure through a drive pressure line in D range and through a rear pressure line in R range, a hydraulic pressure distributing device selecting and supplying the hydraulic pressure supplied from the shift controller by the control of the solenoid valves to the first, second, third, fourth, fifth, sixth, seventh friction members, and a plurality of accumulators disposed on the first, fourth, and seventh friction members.

6 Claims, 12 Drawing Sheets

HYDRAULIC CONTROL SYSTEM OF AN AUTOMATIC TRANSMISSION FOR A VEHICLE

BACKGROUND

The present invention relates to a hydraulic control system of an automatic transmission for a vehicle. More particularly, it relates to a hydraulic control system of an automatic transmission for a vehicle improving shift quality, when manual range shifting, by minimizing shifting shock.

An automatic transmission for a vehicle has a torque converter, a multiple stage transmitting gear mechanism connected to the torque converter, and a hydraulic actuated friction member for selecting one of the multiple stage transmitting gears according to the driving condition of a vehicle.

The hydraulic control system, controlling the engagement of the hydraulic actuated friction member, operates the hydraulic pressure generated from an oil pump by selecting the friction member by a control valve.

The hydraulic control system comprises a pressure regulating means, regulating the hydraulic pressure generated from the oil pump; a manual and automatic transmitting control means, forming shift mode; a hydraulic control means, regulating shift quality and responsibility to form smooth transmission mode when range shifting; a damper clutch control means for engaging a damper clutch of a torque converter; and a hydraulic distribution means distributing hydraulic pressure supply to each friction member.

The hydraulic control means regulates a supplied line pressure, torque converter supply pressure, and solenoid valve supply pressure. These hydraulic pressures influence the shift quality.

Accordingly, it is desirable to engage the friction member by supplying regulated hydraulic pressure when range shifting and to change the apply pressure of the friction member into drive pressure when finishing a motive.

The conventional art for a hydraulic control systems that engages the friction member by the drive pressure after engaging the friction member by the torque pressure is disclosed in Korean Patent Application No. 94-37992. That invention, however, has some problems in that shifting shock is strong when range shifting and shift Control is complicated, and therefore, a hydraulic control system is disclosed in Korean Patent Application No. 95-13459 to solve such problems.

The second invention, however, could not perfectly reduce the shifting shock when range shifting in D range and manual range shifting.

SUMMARY

Accordingly, the object of the present invention is to provide a hydraulic control system of an automatic transmission for a vehicle for minimizing shifting shock and improving shift quality when manual range shifting.

To achieve the object and in accordance with the purpose of the invention, as embodied and broadly described herein, the present invention provides a hydraulic control system of an automatic transmission for a vehicle comprising:

a pressure regulating means having a pressure regulating valve and changing a hydraulic pressure according to vehicle driving condition by being supplied from an oil pump;

a torque pressure changing/supplying means having a solenoid supply valve, a torque control regulator valve, and a control switch valve and changing a line pressure supplied from the pressure regulating means into a torque pressure and supplying it;

a shift control means supplying the hydraulic pressure through a drive pressure line in D range and through a rear pressure line in R range by a manual valve cooperating with a shift selecting lever;

a hydraulic pressure distributing means having a 1-2 shift valve, a 2-3 shift valve, and a 3-4 shift valve and a second clutch valve, a third clutch valve, and a fourth clutch valve, and selecting and supplying the hydraulic pressure supplied from the torque pressure changing/shifting control means by the control of the solenoid valves as the first, second, third, fourth, fifth, sixth, seventh friction members; and an accumulator on a line supplying the hydraulic pressure as the first friction member being engaged in a 1, 2, 3, 4-speeds D range, the fourth friction member being engaged in all transmitting stages except the 4-speed D range, the fifth friction member being engaged in the 2, 3, 4-speeds D range, and the seventh friction member being engaged in the 2-speed 2 range of the hydraulic pressure distributing means.

The 1-2 shift valve supplies the torque pressure supplied from the torque pressure line and the drive pressure supplied from the manual valve to the fifth friction member through the second clutch valve with changing ports by an on/off control of a solenoid valve controlling it when range shifting from the 1-speed to the 2-speed D range.

The 2-3 shift valve supplies the torque pressure supplied from the 1-2 shift valve and the part of the hydraulic pressure supplying to the third friction member to the second friction member through the third clutch valve and supplies the line through which the drive pressure and the torque pressure can pass from the manual valve when range shifting from the 3-speed D range to the 1-speed L range by changing the ports by on/off control of the solenoid valve controlling it when range shifting from the 2-speed to the 3-speed D range.

The 3-4 shift valve supplies the torque pressure supplied from the 2-3 shift valve and the part of the hydraulic pressure supplying to the second friction member to the third friction member through the fourth clutch valve, at the same time, obstructs to supply the hydraulic pressure to the first friction member, and supplies the torque pressure supplied through the torque pressure line when range shifting from the 4-speed D range to the 2-speed 2 range to the seventh friction member through the third clutch valve and the second clutch valve with changing the ports by on/off control of the solenoid valve controlling it when range shifting from the 3-speed to the 4-speed D range.

The seventh friction member can be compensated by the drive pressure supplied from the manual valve after being controlled by the torque pressure when manual range shifting from the 4-speed D range to the 2-speed 2 range.

Furthermore, the sixth friction member can be compensated by the drive pressure supplied from the manual valve after being controlled by the torque pressure when manual range shifting from the 3-speed D range to the 1-speed L range.

DESCRIPTION

Reference will now be made in detail to the preferred embodiments of the invention, examples of which are illustrated in the accompanying drawings.

Figure 1:
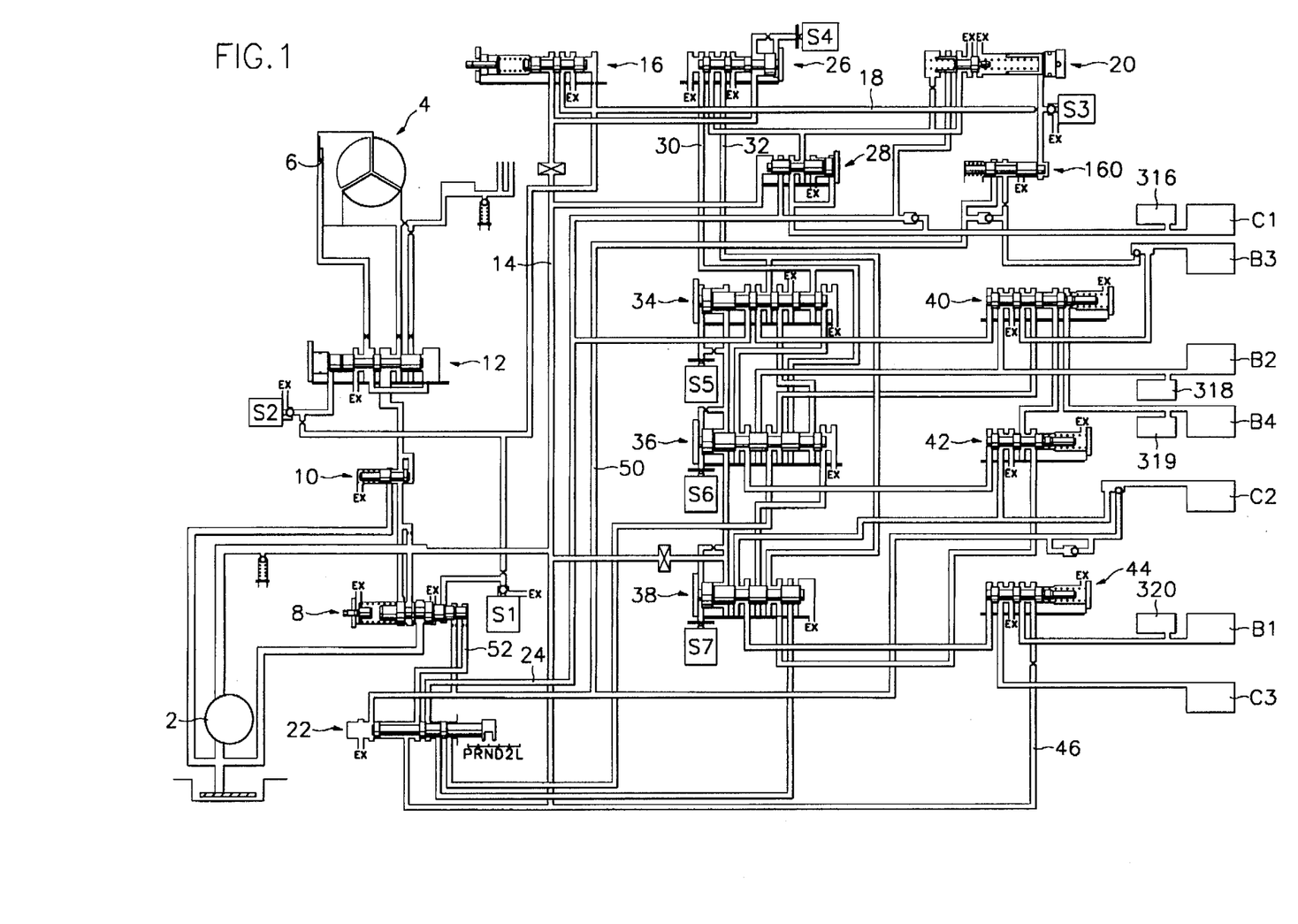
FIG. 1 is a structural diagram of a hydraulic control system in accordance with an embodiment of the present invention.

FIG. 1 is a structural diagram of a hydraulic control system in accordance with an embodiment of the present invention.

The inventive hydraulic control system comprises an oil pump 2 pumping oil by a driving force of an engine, a torque converter 4 transmitting power of the engine to an input axis of a transmission, a damper clutch 6 mounted in the torque converter and improving power transmission efficiency, a pressure regulating valve 8 regulating hydraulic pressure generated from the oil pump according to the driving condition, a converter feed valve 10 supplying hydraulic pressure passing through the pressure regulating valve 8 to an apply pressure of the torque converter and a lubrication section, and a converter clutch regulating valve 12 controlling to engage the damper clutch.

The pressure regulating valve 8 and the converter clutch regulating valve 12 changes ports by first and second solenoid valves S1 and S2, duty controlled respectively by a transmission control unit.

Additionally, the pressure regulating valve 8 is connected with a solenoid supply valve 16, through which the hydraulic pressure can be supplied, by a line pressure line 14, and the hydraulic pressure passing through the solenoid supply valve 16 is supplied to the first and second solenoid valves S1 and S2, and to a third solenoid valve S3 by a line 18.

The third solenoid valve S3 is connected with a torque control regulator valve 20 to be able to change ports of the torque control regulator valve 20. The torque control regulator valve 20 is connected with a manual valve 22, changing the ports according to a position of a shift selecting lever (not shown) by being supplied with the hydraulic pressure from the line pressure line 14 through a drive pressure line 24.

The torque control regulator valve 20 supplies torque pressure controlled by the third solenoid valve S3 to a control switch valve 26 and to a N-D control valve 28 reducing shifting shock generating when range shifting from a neutral range N to a drive range D.

The N-D control valve 28 supplies the torque pressure to a first friction member C1 operating together with a fourth friction member B1 being engaged by being directly supplied with the line pressure when initial range shifting.

The torque pressure, supplied to the control switch valve 26, is selectively supplied to a first torque pressure line 30 and a second torque pressure line 32 according to an operation of a fourth solenoid valve S4 on/off controlled by the transmission control unit.

The first and second torque pressure lines 30 and 32 are connected with a 1-2 shift valve 34 supplying a drive pressure to a fifth friction member B2. The drive pressure is supplied from the drive pressure line 24 by changing the ports by on/off control of a fifth solenoid valve S5 controlled by the transmission control unit when range shifting from a 1-speed to a 2-speed.

A 2-3 shift valve 36, changing the ports by on/off control of a sixth solenoid valve S6 controlled by the transmission control unit in a 3-speed transmitting stage, controls a range shift of the 3-speed by supplying the part of the hydraulic pressure supplied to the fifth friction member B2 to the second friction member C2, and a 3-4 shift valve 38 changing the ports by on/off control of a seventh solenoid valve S7, which is controlled by the transmission control unit that supplies the part of the hydraulic pressure supplied to the second friction member C2 to a third friction member C3.

In addition, a second clutch valve 40 supplied with the hydraulic pressure from 1-2 shift valve 34 in the 2-speed D range supplies this hydraulic pressure to the fifth friction member B2, at the same time, to the 2-3 shift valve 36, and also to a sixth friction member B3 or to a seventh friction member B4 since the second clutch valve 40 is connected with a third clutch valve 42 connected with the 3-4 shift valve 38.

The third clutch valve 42 supplies the hydraulic pressure supplied from the 2-3 shift valve 36 to the second friction member C2, and thereby engaging the second friction member C2 and supplying the hydraulic pressure to the 3-4 shift valve 38.

A fourth clutch valve 44 is supplied with the hydraulic pressure from the 3-4 shift valve 38 and engages the third friction member C3, and the fourth clutch valve 44 engages the fourth friction member B1 being engaged always in 1, 2, 3-speeds D range by the hydraulic pressure supplied through a line 46 branched off from the line pressure line 14.

To describe the hydraulic control system of the present invention, according to their function as shown in FIG. 2 to FIG. 5, is as follows.

Figure 2:
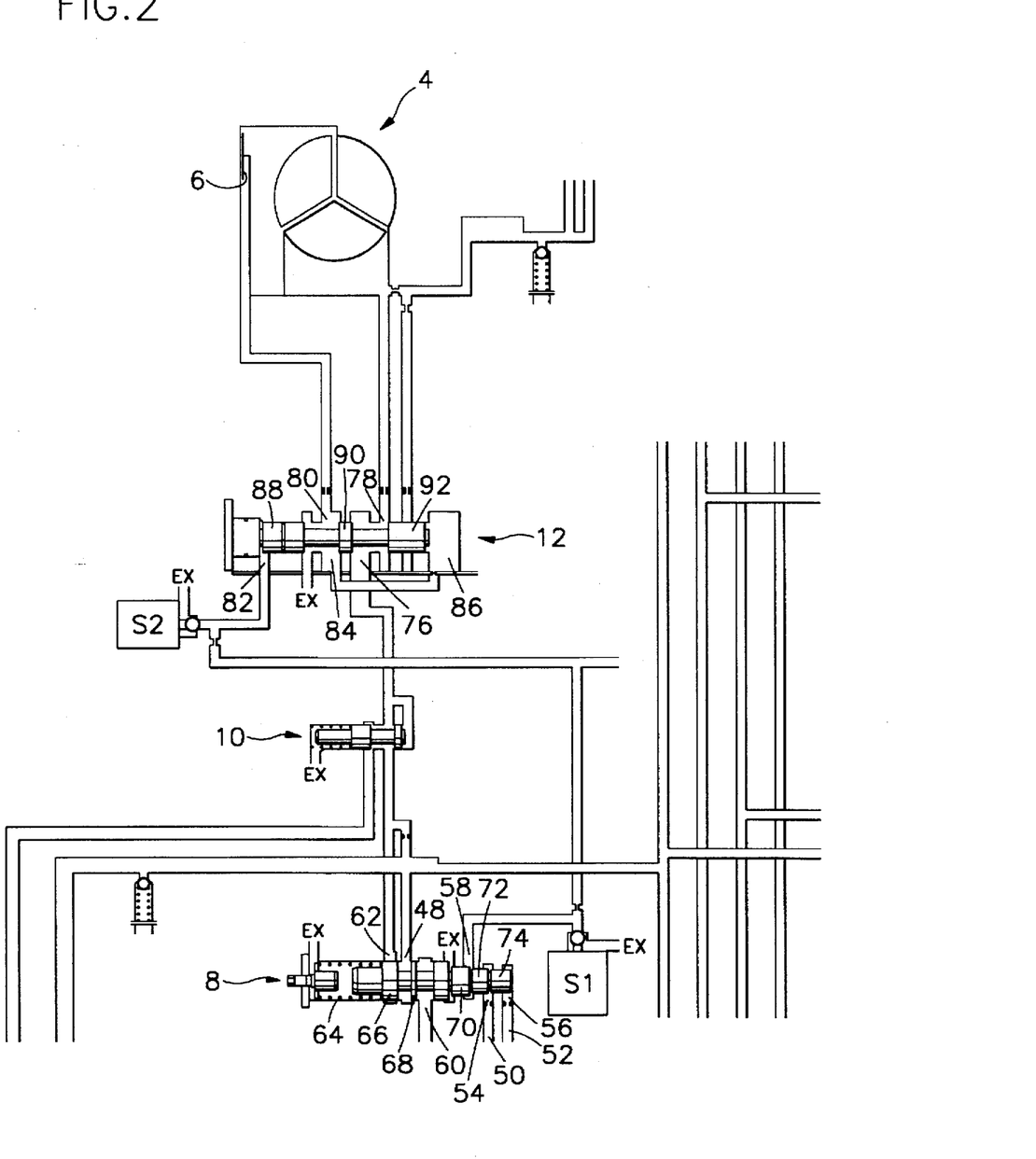
FIG. 2 is a detailed view of a pressure regulating portion of the hydraulic control system in accordance with the embodiment of the present invention.

FIG. 2 is a view illustrating a pressure regulating portion of the inventive hydraulic control system.

A pressure regulating valve 8 comprising the pressure regulating portion includes a first port 48 supplied with the hydraulic pressure supplied from the oil pump 2, second and third ports 54 and 56 connected with the manual valve 22, a rear pressure line 50, and a main line 52 and supplied with the hydraulic pressure, a fourth port 58 supplied with the hydraulic pressure controlled by a first solenoid valve S1, a fifth port 60 exhausting the extra hydraulic pressure, and a sixth port 62 supplying the hydraulic pressure to the converter feed valve 10.

A valve spool, one end of which is elastically supported by the spring 64, comprises a first land 66 opening and closing the sixth port 62, a second land 68 exhausting the oil by regulating an opening degree of the fifth port for exhausting, and third, fourth, and fifth lands 70, 72 and 74 in which the hydraulic pressure flowing through the fourth, second, and third ports 58, 54, and 56 applies.

The converter feed valve 10, supplied with the hydraulic pressure from the sixth port 62, is connected with the converter clutch regulating valve 12 by the line to be able to supply the hydraulic pressure.

The converter clutch regulating valve 12 operates or exhausts the damper clutch 6 of the torque converter 4, and supplies oil to each lubrication section by the second solenoid valve S2 variably controlled by the transmission control unit.

The converter clutch regulating valve 12 comprises a first port through which the hydraulic pressure is supplied, a second port 78 supplying the hydraulic pressure to engage the damper clutch 6, a third port 80 supplying the hydraulic pressure to unengage the damper clutch 6, a fourth port 82 applying or exhausting the hydraulic pressure to the second solenoid valve S2, fifth and sixth ports 84 and 86 supplying the hydraulic pressure resisting the hydraulic pressure supplied to the fourth port 82.

The valve spool of the converter clutch regulating valve 12 comprises a first land 88 in which the hydraulic pressure flowing into the fourth port 82 applies, a second land 90 communicating selectively the first port 76 and the second or third port 78 and 80, and a third land 92 in which the hydraulic pressure flowing into the sixth port 86 applies.

Figure 3:
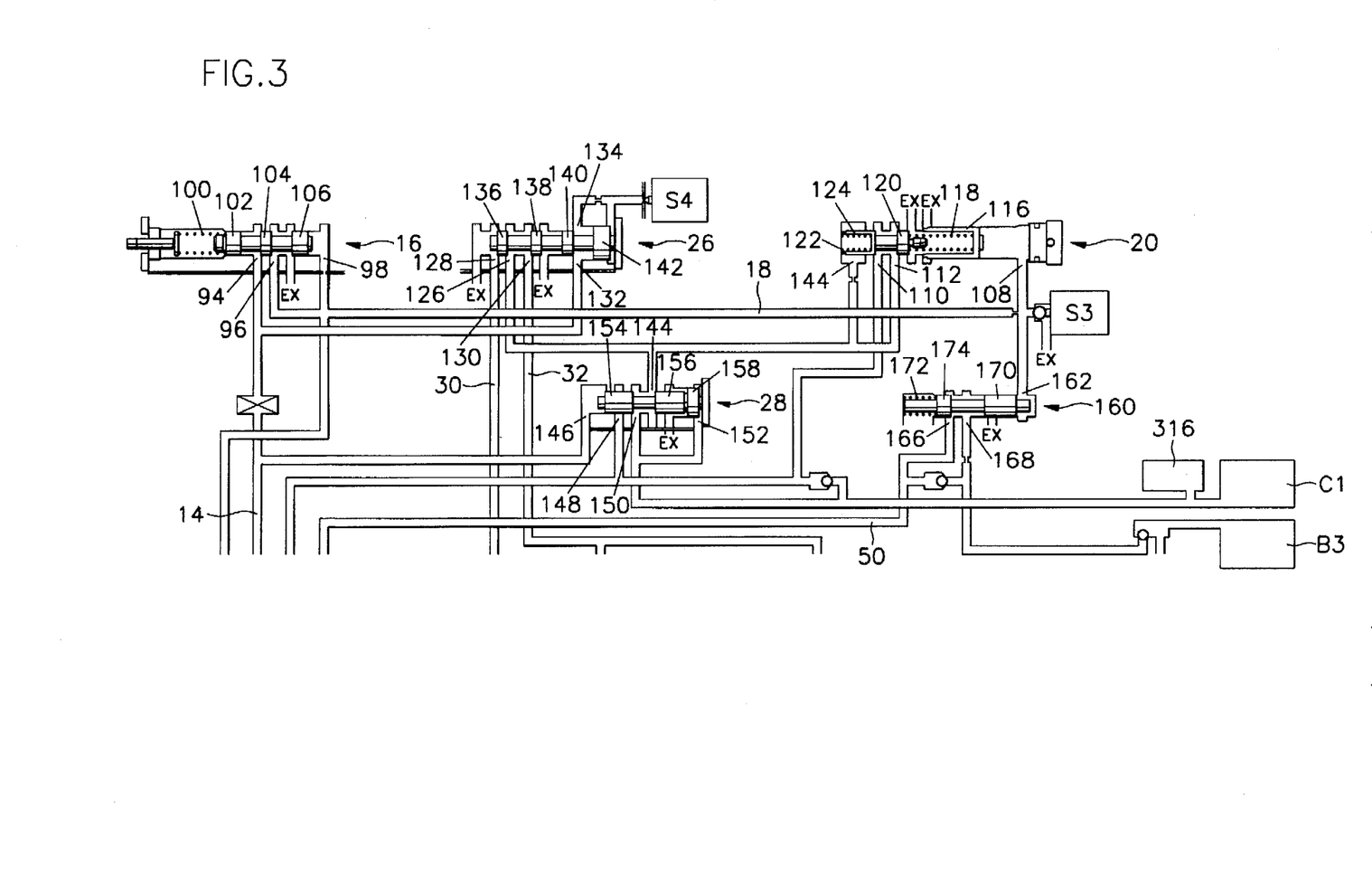
FIG. 3 is a detailed view of a torque pressure changing/supplying portion of the hydraulic control system in accordance with the embodiment of the present invention.

FIG. 3 is a structural diagram of a torque pressure changing/supplying portion in accordance with the embodiment of the present invention wherein a solenoid supply valve 16 supplying the line pressure supplied from the pressure regulating valve 8 through the line pressure line 14 to the first, second, and third solenoid valve S1, S2, and S3 comprises a first port 94 communicated with the line pressure line 14, a second port 96 supplying the hydraulic pressure flowing into the first port 94 to the line 18, and a third port 98 related to the port change by being supplied with the hydraulic pressure through the second port 96.

The valve spool of the solenoid supply valve 16 comprises a first land 102 which is elastically supported by a spring 100, a second land 104 changing the opening degree of the second port 86, and a third land 106 in which the hydraulic pressure supplied to the third port 98 applies.

The torque control regulator valve 20 changing the ports by on/off control of the third solenoid valve S3 comprises a first port 108 supplied with the control pressure, a second port 110 supplied with the hydraulic pressure flowing from the manual valve 22 along the drive pressure line 24, third and fourth ports 112 and 114 selectively supplied with hydraulic pressure flowing into the second port 110 according to the port change.

The torque control regulator valve 20 comprises a first plug 116 moving by the hydraulic pressure supplied to the first port 108, a spring 118 that elastically supports the plug, a land 120 elastically supported by the other side of the spring 118, and a second plug elastically supported by the other spring 122.

The control switch valve 26 to which the hydraulic pressure is selectively supplied from the second and third ports 110 and 112 comprises a first port 126 to which the hydraulic pressure is supplied from the third port 112 of the torque control regulator valve 20, second and third ports 128 and 130 from which the hydraulic pressure supplied to the first port 126 is selectively exhausted, a fourth port 132 to which the hydraulic pressure is directly supplied from the line pressure line 14, and a fifth port 134 communicated with the fourth solenoid valve S4 applying the hydraulic pressure to the spool in opposite direction to the hydraulic pressure of the fourth port 132 to use the hydraulic pressure supplied to the fourth port 132 in the port change.

The valve spool of the control switch valve 26 comprises a first land 136 opening and closing the first port 126 and the second port 128, a second land 138 opening and closing the first port 126 and the third port 130, a third land 140 in which the hydraulic pressure of the fourth port 130 applies, and a fourth land in which the hydraulic pressure of the fifth port 134 applies.

The N-D control valve 28, reducing the shifting shock when range shifting from the N range to the D range by being supplied with the torque pressure from the torque control regulator valve 20, comprises a first port 144 supplied with the torque pressure, a second port 146 supplied with the line pressure, a third port 148 supplied with the drive pressure, a fourth port 150 supplying the hydraulic pressure supplied to the third port 143 to the first friction member C1, and a fifth port 152 changing the ports by being supplied with the hydraulic pressure supplied from the fourth port 150.

The valve spool of the N-D control valve 28 comprises a first land 154 in which the hydraulic pressure supplied to the second port 146 applies, a second land 156 obstructing the hydraulic pressure supplied to the first port 144, and a third land 158 in which the hydraulic pressure supplied to the fifth port 152 applies.

A N-R control valve 160 supplying to the sixth friction member B3 engaging in a reverse driving mode comprises a first port 162 supplied with the control pressure of the third solenoid valve S3, a second port 166 supplied with the rear pressure from the manual valve 22 along the rear pressure line 50, and a third port 168 supplying the rear pressure supplied to the second port 166 to the sixth friction member B3.

The valve spool of the N-R control valve 160 comprises a first land 170 in which the hydraulic pressure supplied to the first port 164 applies, and a second land 174 elastically supported by a spring 172 and supporting elastically the second port 162.

Figure 4:
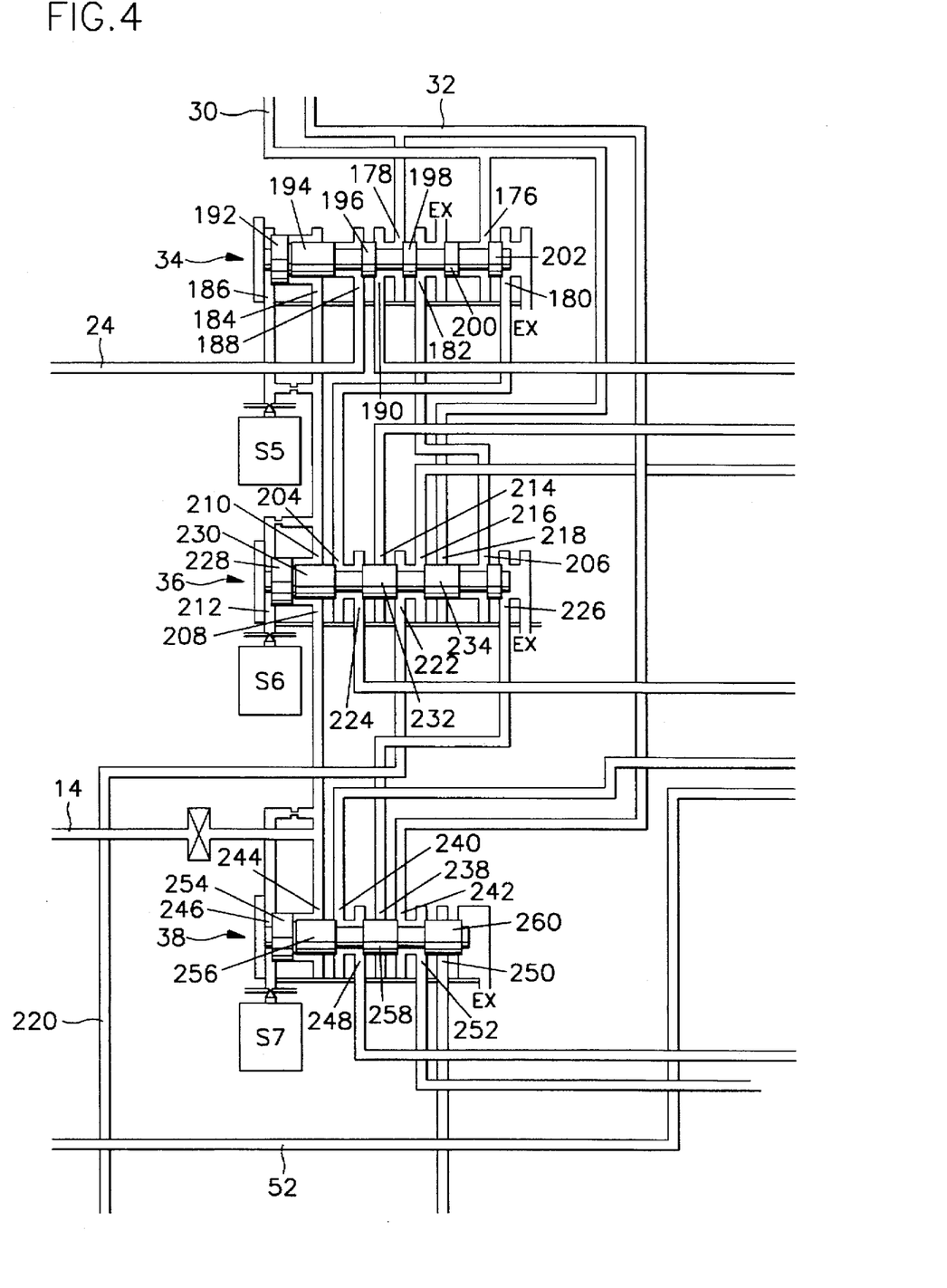
FIG. 4 is a view showing links of shift valves of the hydraulic control system in accordance with the embodiment of the present invention.

FIG. 4 is a view showing links of shift valves of the hydraulic control system in accordance with the embodiment of the present invention.

The 1-2 shift valve 34 for supplying the apply pressure to the fifth friction member B2 when range shifting from the 1-speed to the 2-speed D range comprises first and second ports 176 and 178 respectively supplied with the torque pressure from the first and second torque pressure lines 30 and 32.

The 1-2 shift valve 34 further comprises a third port 180 supplying the hydraulic pressure supplied to the first port 176 to one of the ports of the 2-3 shift valve 36, and a fourth port 182 supplying the hydraulic pressure supplied to the second port 178 to the other port of the 2-3 shift valve 36.

The 1-2 shift valve 34 further comprises a fifth port 184 supplied with the hydraulic pressure from the line pressure line 14 through the 2-3 shift valve 36, a sixth port 186 supplied with the above hydraulic pressure controlled by on/off control of the fifth solenoid valve S5, a seventh port 188 supplied with the hydraulic pressure from the drive pressure line 24, and an eighth port 190 supplying the hydraulic pressure supplied to the seventh port 188 to the second clutch valve 40.

The valve spool of the 1-2 shift valve 34 comprises a first land 192 in which the hydraulic pressure supplied to the fifth and sixth port 184 and 186 applies to the both sides of the first land 192, a second land 194 in which the hydraulic pressure of the seventh port 188 is applied, a third land 196 communicating the eighth port 190 and the seventh port 188 or obstructing it, a fourth land 198 communicating selectively the second port 178 and the seventh port 188 or the eighth port 192, a fifth land 200 in which the part of the hydraulic pressure flowing into the first port 176 applies, and a sixth land 202 in which the hydraulic pressure supplied to the third port 180 applies.

The 2-3 shift valve 36 supplying the hydraulic pressure to the second friction member C2 when range shifting from the 2-speed to the 3-speed comprises a first port 204 supplied with the hydraulic pressure by being connected with the third port 180 of the 1-2 shift valve 34, a second port 206 supplied with the hydraulic pressure by being connected with the fourth port 182 of the 1-2 shift valve 34, a third port 208 supplied with the hydraulic pressure of the line pressure line 14, and a fourth port 210 supplying the line pressure line 14 of the third port 208 to the fifth and sixth ports 184 and 186 of the 1-2 shift valve 34.

The 2-3 shift valve 36 further comprises a fifth port 212 supplied with the line pressure of the fourth port 210 controlled by the sixth solenoid valve S6, a sixth port 214 supplied with the part of the hydraulic pressure flowing into the fifth friction member B2, a seventh port 216 supplying selectively the hydraulic pressure flowing into the first port 204 or the sixth port 214 to the third clutch valve 42, an eighth port 218 directly communicated with the first torque pressure line 30, a ninth port 222 communicated with the line 220 supplied with the hydraulic pressure in L range, a tenth port 224 supplying the hydraulic pressure supplied to the sixth port 214 to the third clutch valve 42, and an eleventh port 226 supplying the hydraulic pressure flowing into the second port 206 to one of ports of the 3-4 shift valve 38.

The valve spool of the 2-3 shift valve 36 comprises a first land 228 in which the hydraulic pressures of the third port 208 and the fifth port 212 is applied to the both sides thereof, a second land 230 in which the part of the hydraulic pressure of the first port 204 applies, a third land 232 communicating selectively the seventh port 216 and the eighth port 218, and a fifth land communicating selectively the second port 206 and the eleventh port 226.

The 3-4 shift valve 33 supplying the hydraulic pressure to disengage the fourth friction member B1 and to engage the third friction member C3 when range shifting from the 3-speed to the 4-speed comprises a first port 238 supplied with the hydraulic pressure from the eleventh port 236 of the 2-3 shift valve 36, a second port 240 supplied with the part of the hydraulic pressure supplying to the second friction member C2, a third port 242 connected with the second torque pressure line 32, a fourth port 244 supplied with the line pressure from the line pressure line 14, and a fifth port 246 supplied with the line pressure controlled by the fifth solenoid valve S7.

The 3-4 shift valve 38 further comprises a sixth port 248 supplying the hydraulic pressure supplied to the first port 238 to the fourth clutch valve 44, a seventh port 250 supplied with the drive pressure from the manual valve in 2 range and L range, and an eighth port 252 supplying the hydraulic pressure supplied to the seventh port 250 to the seventh friction member B4 through the third clutch valve 42 and the second clutch valve 40.

The valve spool of the 3-4 shift valve 38 comprises a first land 254 in which the hydraulic pressure of the fourth port 244 and the fifth port 246 applies to the both sides of thereof, a second land 256 in which the part of the hydraulic pressure of the second port 240 is applied, a third land 258 communicating selectively the third port 242 and the eighth port 252, and a fourth land 260 communicating selectively the seventh port 250 and the eighth port 252.

Figure 5:
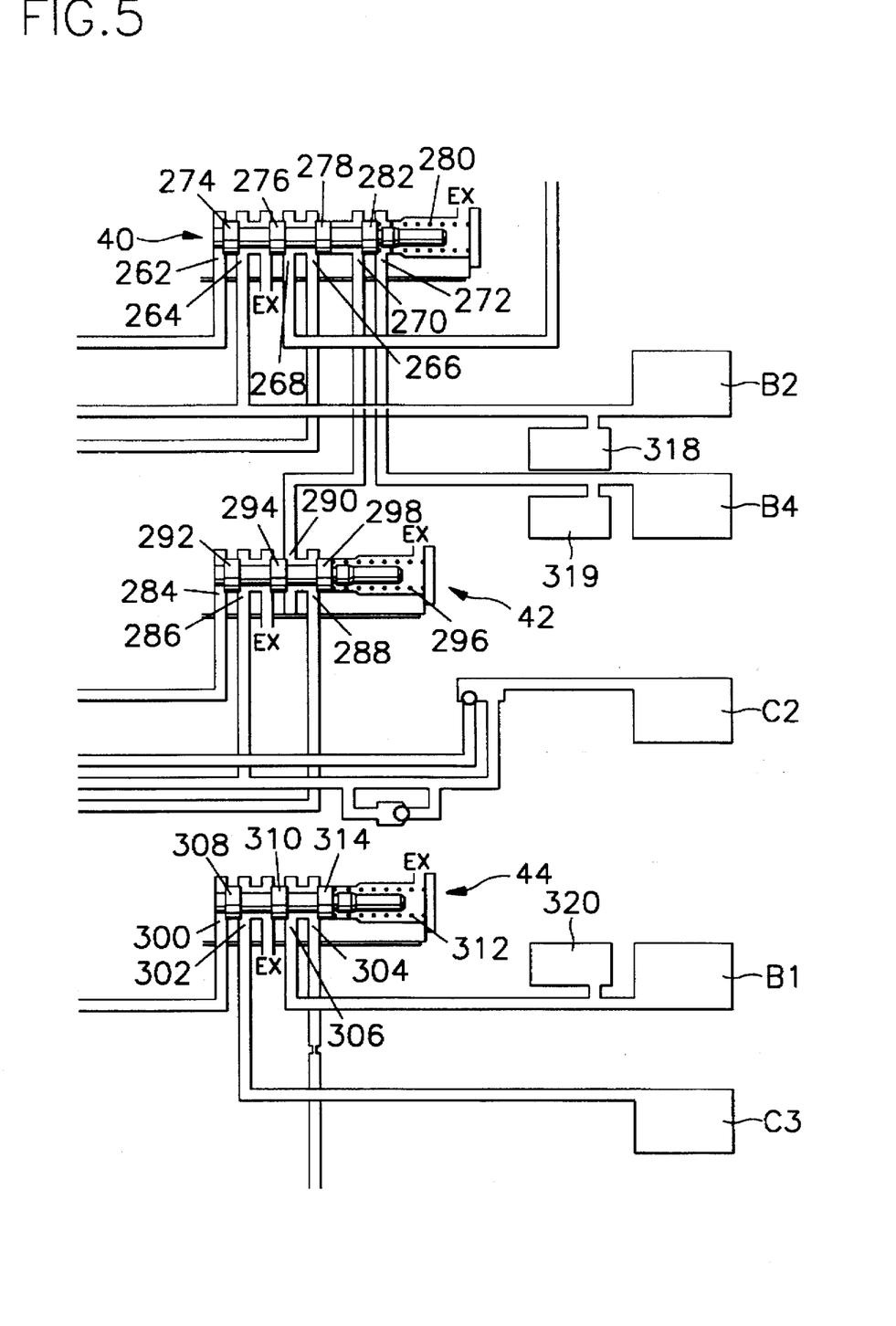
FIG. 5 is a view showing links of clutch and brake valves of the hydraulic control system in accordance with the embodiment of the present invention.

FIG. 5 is a view showing links of valves supplying selectively the hydraulic pressure to each friction member of the hydraulic control system in accordance with the embodiment of the present invention.

The second clutch valve 40 supplied with the hydraulic pressure from the 1-2 shift valve 34 comprises a first port 262 supplied with the hydraulic pressure from the 1-2 shift valve 34, and a second port 264 supplying the hydraulic pressure supplied to the first port 262 to the third friction member B2 and the 2-3 shift valve 36.

The second clutch valve 40 further comprises a third port 266 supplied with the hydraulic pressure from the seventh port 216, a fourth port 268 supplying the hydraulic pressure supplied to the third port 282, a fifth port 270 supplied with the hydraulic pressure by being communicated with one of the ports of the third shift valve 42, and a sixth port 272 supplying the hydraulic pressure supplied to the fifth port 270 to the seventh friction member B4.

The valve spool of the second clutch valve 40 comprises a first land 274 communicating selectively the first port 262 and the second port 264, a second land 276 communicating selectively the third port 266 and the fourth port 268, a third land 278 obstructing the third port 286 and the fifth port 270, and a fourth land 282 elastically supported by a spring 280 and communicating selectively the fifth port 282 and the sixth port 284.

The third clutch valve 42 supplying the hydraulic pressure supplied from the 2-3 shift valve to the fourth friction member C2 comprises a first port 284 supplied with the hydraulic pressure from the 2-3 shift valve 36, a second port 286 supplying the hydraulic pressure supplying to the first port 284 to the fourth friction member C2 and the 3-4 shift valve 38, a third port 288 supplied with the drive pressure of the manual valve 22 through the eighth port 252 of the 3-4 shift valve 38 in 2 and L range, and a fourth port 290 supplying the hydraulic pressure supplied to the third port 288 to the fifth port 270 of the second clutch valve 40.

The valve spool of the third clutch valve 42 comprises a first land 292 communicating selectively the first port 284 and the second port 286, a second land 294 communicating selectively the third port 288 and the fourth port 290, and a third land 298 elastically supported by a spring 296.

The fourth clutch valve 44 supplying the line pressure to the fourth friction member B1 in the 1, 2, 3-speeds D range, and supplying the hydraulic pressure to the third friction member C3 in the 4-speed D range comprises a first port 300 supplied with the hydraulic pressure from the 3-4 shift valve 38, a second port 302 supplying the hydraulic pressure supplied to the first port 300 to the third friction member C3, a third port 304 supplied with the hydraulic pressure from the line pressure line 14, and a fourth port 306 supplying the hydraulic pressure supplied to the third port 304 to the fourth friction member B1.

The valve spool of the fourth clutch valve 44 comprises a first land 308 communicating selectively the first port 300 and the second port 302, a second land 310 communicating selectively the third port 304 and the fourth port 306, and a third land 314 elastically supported by a spring 312.

The inventive hydraulic control system comprises accumulators 316, 318, 320, and 322 disposed on the lines supplying the hydraulic pressure to the first friction member C1 being engaged in the 1, 2, 3, 4-speeds D range, the fourth friction member B1 being engaged in all transmitting stages except the 4-speed D range, the fifth friction member B2 being engaged in the 2, 3, 4-speed D range, and the seventh friction member B4 being engaged only in the 2-speed 2 range.

A transmitting process according to each shifting stage of the inventive hydraulic control system is as follows.

When starting, since the hydraulic pressure supplied to the fourth port 58 of the pressure regulating valve 8 is changed by controlling variably the first solenoid valve S1 of the hydraulic control system, the hydraulic pressure applying to the third land 70 increases or vanishes, and therefore, the fifth port 60 exhausts or obstructs the hydraulic pressure generated from the oil pump 2 by being communicated with the first port 48.

The line pressure controlled by such operations is supplied to the first port 94 of the solenoid supply valve 16 and exhausted through the second port 96. The part of the hydraulic pressure exhausted through the second port 96 is supplied to the third port 98, applies to the right side of the third land 106, and therefore, the valve spool of the solenoid supply valve 16 moves to the left in the drawing.

Since the second land 104 obstructs partly the second port 96 by such operations described above, the hydraulic pressure supplied to the third port 98 through the second port 104 decreases, and therefore, the valve spool moves back to the right by the elasticity of the spring 100.

The hydraulic pressure exhausted through the second port 104 by repeating such operations is supplied to the first port 108 of the torque control regulator valve 20, and since this hydraulic pressure increases or decreases by on/off control of the third solenoid valve S3, the movement of the first plug 116 is changed.

Since the spring 118 is compressed by the movement of the first plug 116 to the left in the drawing when the third solenoid valve S3 is controlled to be off, the land 120 that receives the elasticity of the spring moves to the left.

When range shifting from N range to D range in this state, the part of the hydraulic pressure of the line pressure line 14 is supplied to the fourth friction member B1 through the fourth clutch valve 44 communicating the third port 304 with the fourth port 306 and engages the fourth friction member B1 in the condition that the valve spool moves to the left by the elasticity of the spring 312.

At the same time, the other part of the hydraulic pressure is supplied to the first port 108 of the torque control regulator valve 20 through the drive pressure line 24 by way of the manual valve 22.

At this time, the hydraulic pressure supplied to the second port 110 by communicating the second port 110 with the third port 112 is exhausted through the third port 112 since the second plug 124 moves to the left with the land 120 of the torque control regulator valve 20 moving to the left by such operations described above.

The hydraulic pressure exhausted through the third port 112 is supplied to the first port 126 of the switch valve 26 and the first port 144 of the N-D control valve 28.

Since the valve spool moves to the right in the drawing by being supplied with the part of the hydraulic pressure of the line pressure line 14 to the second port 146 of the N-D control valve 28, the first port 144 of the N-D control valve 28 remains to be communicated with the fourth port 150 thereof.

Accordingly, the hydraulic pressure supplied from the torque control valve 20 to the first port 144 is exhausted through the fourth port 150 and supplied to the first friction member C1.

The first friction member C1 starts being engaged by the torque pressure. Since the part of the hydraulic pressure exhausted through the fourth port 150 of the N-D control valve 28 is supplied to the fifth port 152 of a detecting chamber and applies to the right side of the third land 158, the valve spool moves to the left in the drawing.

Figure 6:
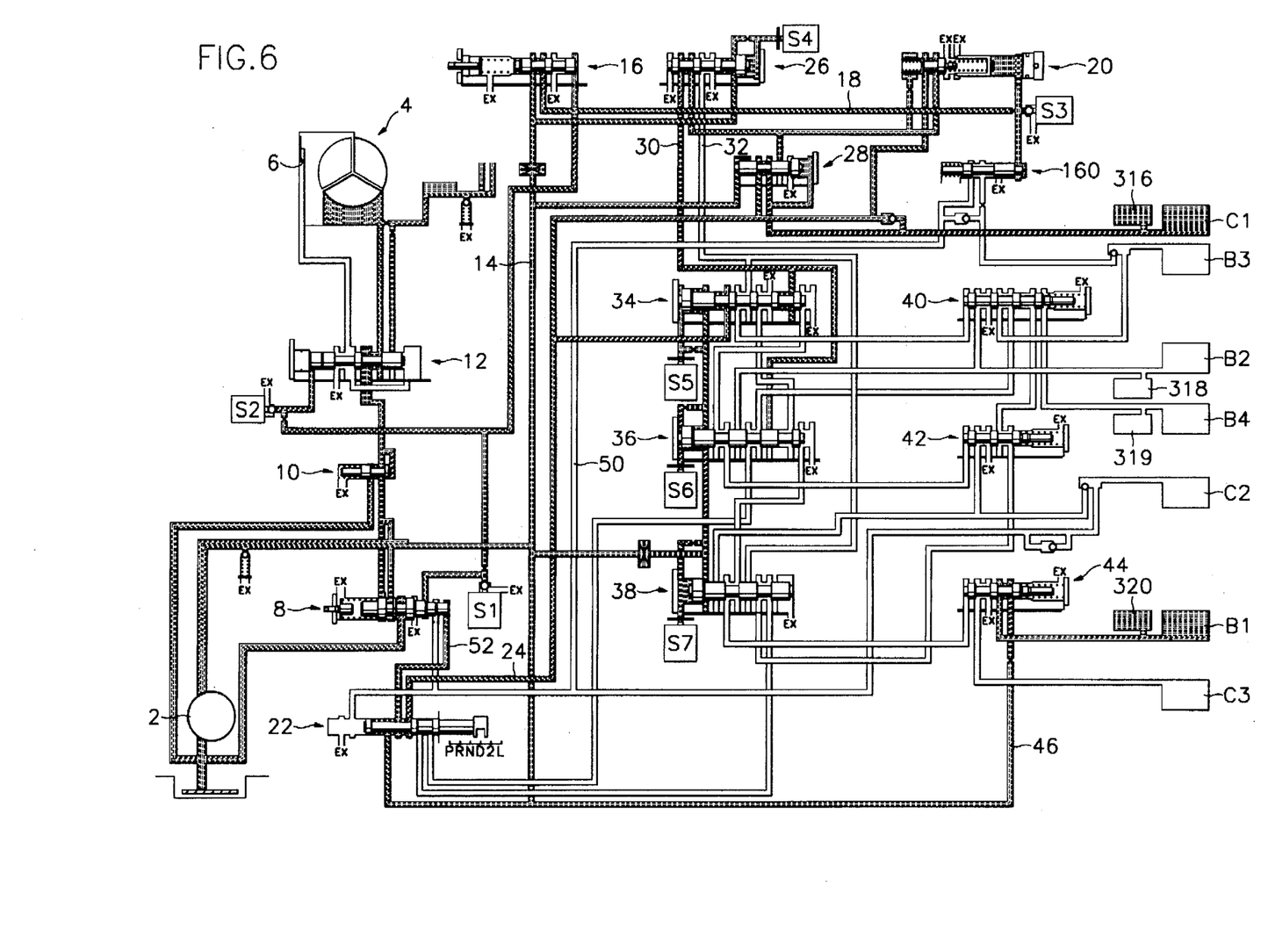
FIG. 6 is a view illustrating a 1-speed transmitting stage operation of the hydraulic control system in accordance with the embodiment of the present invention.

The drive pressure flowing from the manual valve 22 into the third port 148 is supplied to the first friction member C1 by communicating the third port 148 of the N-D control valve 28 with the fourth port 150 thereof, and thereby accomplishing the range shift to the 1-speed in such a condition like FIG. 6 by the engagement of the first and fourth friction members C1 and B1.

The shifting shock when transmitting like the above can be reduced by controlling the hydraulic pressure by the accumulators 316 and 320 when the hydraulic pressure is supplied to the first and fourth friction members C1 and B1.

Figure 7:
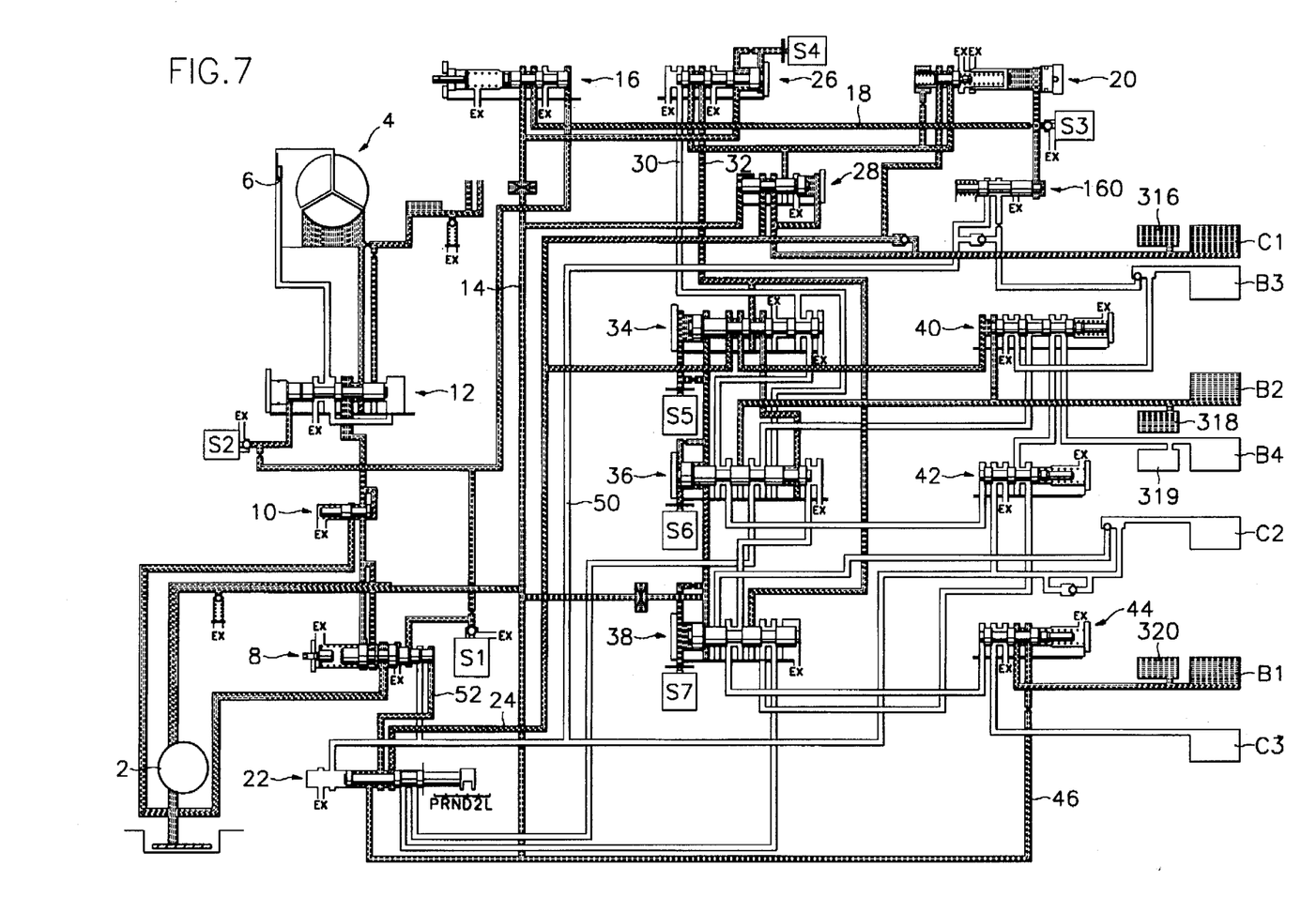
FIG. 7 is a view illustrating a 2-speed transmitting stage operation of the hydraulic control system in accordance with the embodiment of the present invention.

FIG. 7 is a circuit diagram of the hydraulic pressure that the range shifts to the 2-speed by the inventive hydraulic control system.

When the opening degree of a throttle valve increases by the increase of the vehicle speed in the 1-speed, the valve spool of the control switch valve 26 moves to the right in the drawing by controlling the fourth solenoid valve S4 to be on.

The torque pressure supplied to the first port 126 by such an operation is supplied to the second port 178 of the 1-2 shift valve 34 through the third port 130 along the second torque pressure line 32.

The hydraulic pressure supplied to the second port 178 is supplied to the first port 262 of the second clutch valve 40 through the eighth port 190 since the valve spool of the 1-2 shift valve 34 is maintained to move to the left as shown in FIG. 6.

Since the torque pressure applies to the one side of the first land 274 of the second clutch valve 40, the valve spool moves to the right in the drawing by overcoming the elasticity of the spring 280, and therefore, the torque pressure supplied to the first port 262 is preferentially supplied to the third friction member B2 through the second port 262 by communicating the first port 262 with the second port 264, thereby starting the range shift from the 1-speed to the 2-speed.

Since the seventh port 188 is communicated with the eighth port 190 by moving the valve spool of the 1-2 shift valve 34 to the right by off control of the fifth solenoid valve S5, the drive pressure supplied to the seventh port 188 is supplied through the eighth port 190.

The fifth friction member B2 shifts the range to the 2-speed by being controlled by the torque pressure when initial transmitting and maintains in the 2-speed by being engaged by the drive pressure, and the shifting shock when transmitting is reduced by the accumulator 318 when the hydraulic pressure is supplied to the fifth friction member B2.

Figure 8:
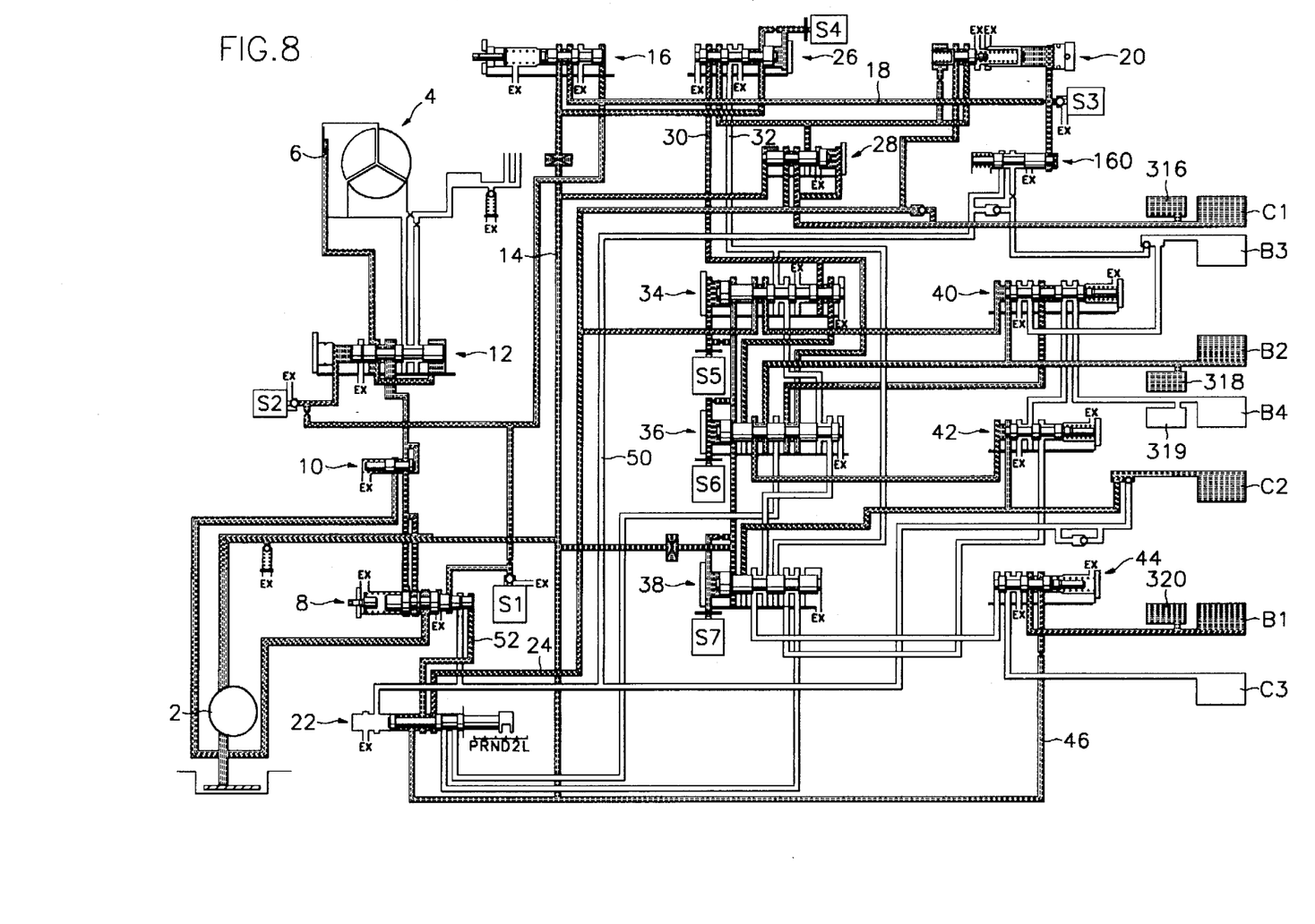
FIG. 8 is a view illustrating a 3-speed transmitting stage operation of the hydraulic control system in accordance with the embodiment of the present invention.

FIG. 8 is a circuit diagram of the hydraulic pressure that the range shifts to the 3-speed by the inventive hydraulic control system.

When the opening degree of a throttle valve increases by the increase of the vehicle speed in the 2-speed, the valve spool of the control switch valve 26 moves to the left in the drawing by controlling the fourth solenoid valve S4 to be off in such a condition maintaining the engagements of the first, fourth, and fifth friction members C1, B1, and B2.

The torque pressure supplied to the first port 126 by such an operation is supplied to the first port 176 of the 1–2 shift valve 34 through the second port 128 along the first torque pressure line 30.

The hydraulic pressure supplied to the first port 176 is supplied to the first port 204 of the 2–3 shift valve 36 through the third port 180 since the valve spool of the 1–2 shift valve 34 is maintained to move to the right as shown in FIG. 7.

Since the first port 204 is communicated with the tenth port 224 by maintaining the valve spool of the 2–3 shift valve 36 to move to the left as shown in FIG. 7, the hydraulic pressure supplied to the first port 204 is supplied to the first port 284 of the third clutch valve 42 through the tenth port 224.

Since the torque pressure applies to the one side of the first land 292 of the third clutch valve 42, the valve spool moves to the right in the drawing by overcoming the elasticity of the spring 296, and therefore, the torque pressure supplied to the first port 284 is preferentially supplied to the second friction member C2 through the second port 286 by communicating the first port 284 with the second port 286, thereby starting the range shift from the 2-speed to the 3-speed.

Since the sixth port 214 is communicated with the tenth port 224 by moving the valve spool of the 2–3 shift valve 36 to the right by off control of the sixth solenoid valve S6, the torque pressure supplied to the first port 284 is obstructed and the drive pressure supplied to the sixth port 214 is supplied through the tenth port 224, and therefore the second friction member C2 is engaged by the drive pressure.

The second friction member C2 shifts the range to the 3-speed by being controlled to be engaged by the torque pressure when initial transmitting and maintains in the 3-speed by being engaged by the drive pressure.

Figure 9:
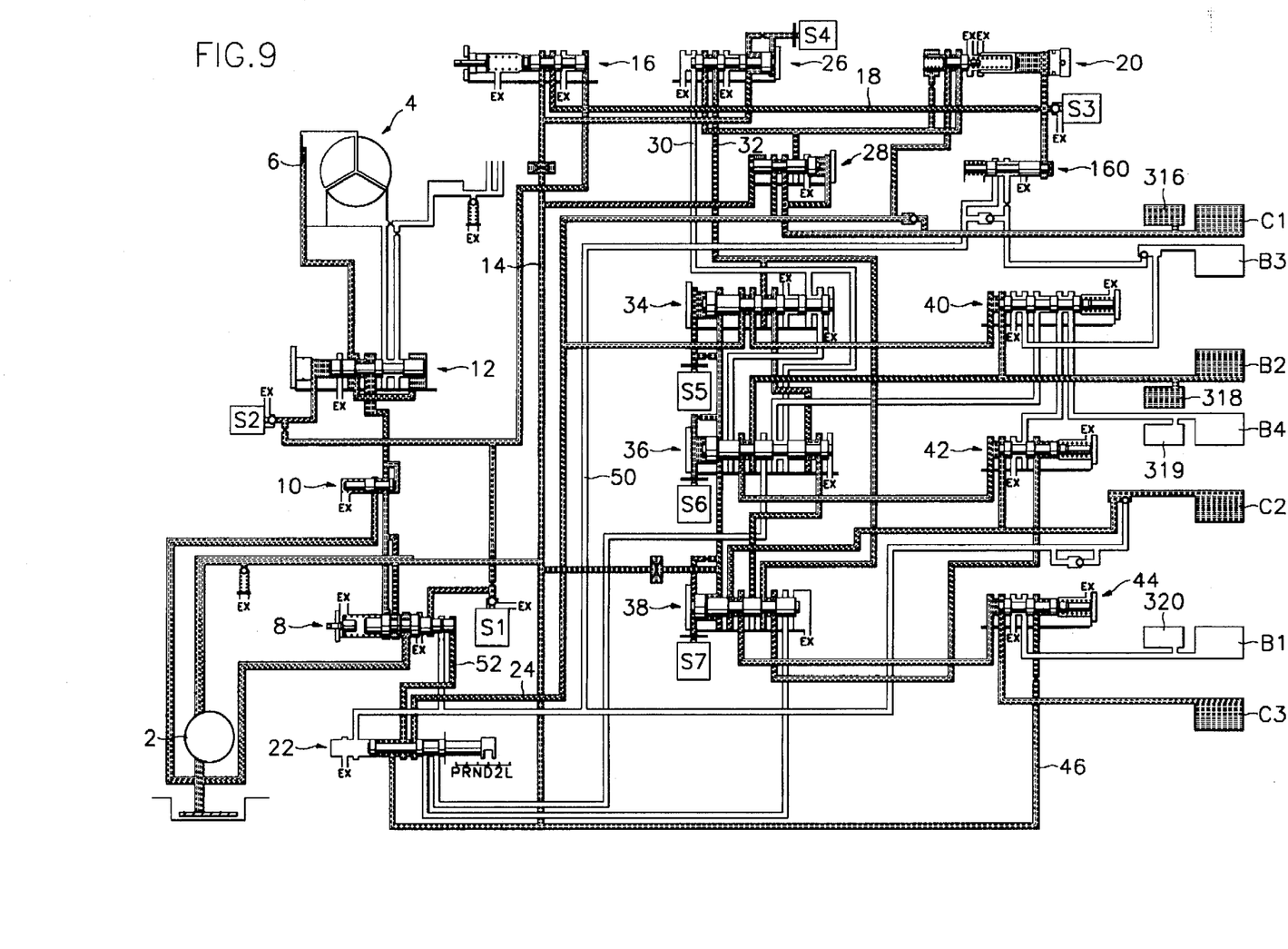
FIG. 9 is a view illustrating a 4-speed transmitting stage operation of the hydraulic control system in accordance with the embodiment of the present invention.

FIG. 9 is a circuit diagram of the hydraulic pressure that range shifts to the 4-speed by the inventive hydraulic control system.

When the opening degree of a throttle valve increases by the increase of the vehicle speed in the 3-speed, the valve spool of the control switch valve 26 moves to the left in the drawing by controlling the fourth solenoid valve S4 to be on in such a condition maintaining the engagements of the first, second, fourth, and fifth friction members C1, C2, B1, and B2.

The torque pressure supplied to the first port 126 by such an operation is supplied to the first port 182 of the 1–2 shift valve 34 and the third port 242 of the 3–4 shift valve through the third port 130 along the second torque pressure line 32, and the torque pressure supplied to the 1–2 shift valve 34 is supplied to the first port 238 of the 3–4 shift valve 38 through the fourth port 182 of the 1–2 shift valve 34 and the second and eleventh ports 206 and 226 of the 2–3 shift valve.

Since the torque pressure applies to the one side of the first land 308 by being supplied to the first port 300 of the fourth clutch valve 44 through the sixth port 248 in such a condition that the valve spool of the 3–4 shift valve 38 is maintained to move to the right by off control of the seventh solenoid valve S7, the valve spool moves to the right in the drawing by overcoming the elasticity of the spring 312, and therefore, obstructs the line pressure supplied to the fourth friction member B1 with obstructing the third port 304 and the fourth port 306 and supplies preferentially the torque pressure supplied to the first port 300 to the third friction member C3 by communicating the first port 300 with the second port 302, thereby starting the range shift from the 3-speed to the 4-speed.

Since the second port 240 is communicated with the sixth port 248 by the valve spool of the 3–4 shift valve 38 moving to the left by on control of the seventh solenoid valve S7, the torque pressure supplied to the first port 238 is obstructed and the drive pressure supplied to the second port 240 is supplied through the sixth port 248, and therefore, the third friction member C3 is engaged by the drive pressure.

The third friction member C3 shifts the range to the 4-speed by being controlled by the torque pressure when initial transmitting and maintains in the 4-speed by being engaged by the drive pressure.

The range shifts to the 1, 2, 3, 4-speeds D range such like the above when an overdrive is on, and the range shifts in the same process with the above but the last transmitting stage is limited to the 3-speed when the overdrive is off.

Figure 10:
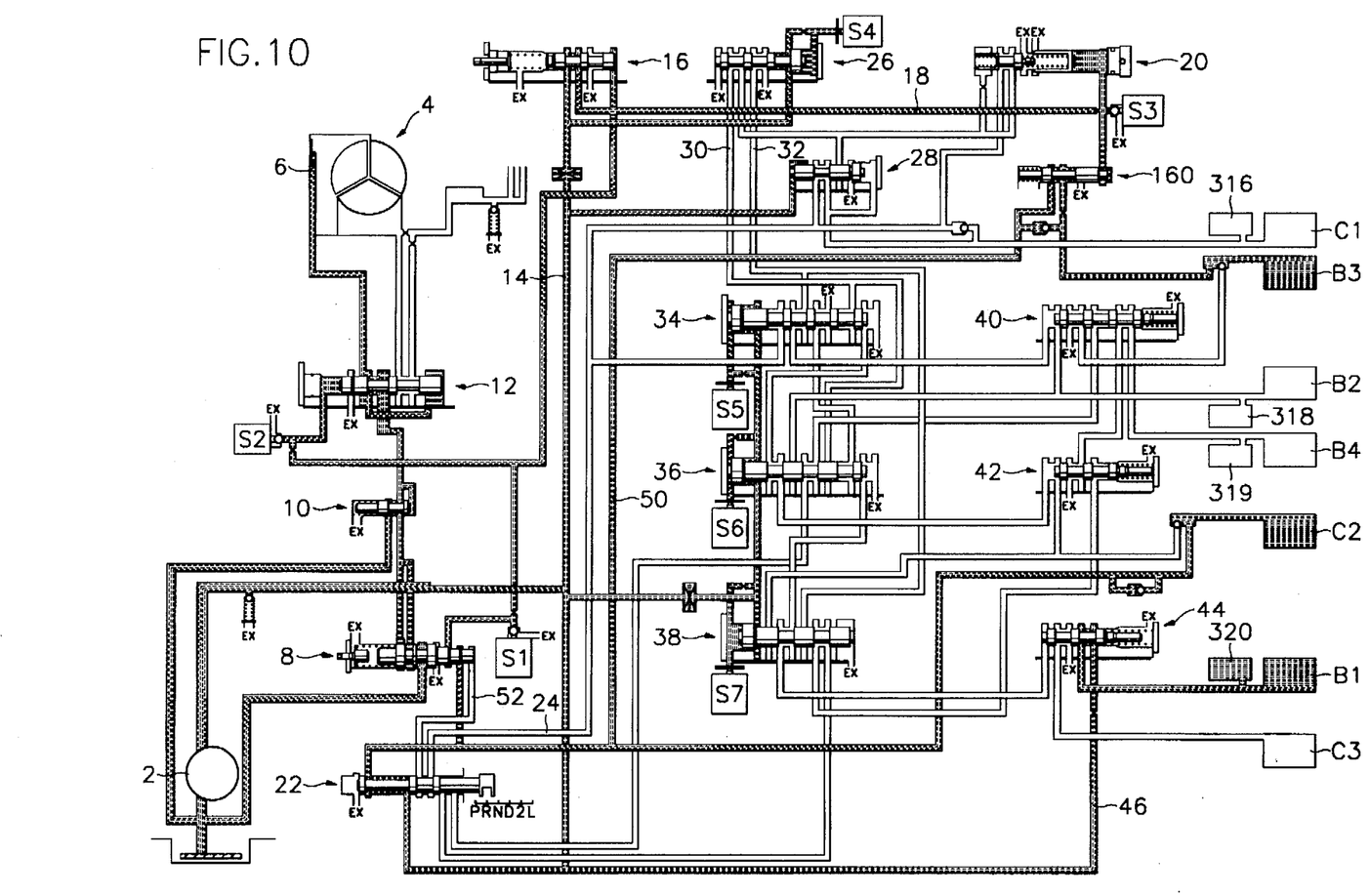
FIG. 10 is a view illustrating a rear transmitting stage operation of the hydraulic control system in accordance with the embodiment of the present invention.

The part of the hydraulic pressure supplied from the manual valve 22 is supplied to the sixth friction member B3, that is, the reverse friction member being supplied to the second and third ports 166 and 168 of the N-R control valve 160, and the other part thereof is supplied to the second friction member C2 when the shifting mode is changed into the reverse R range.

At the same time, the part of the hydraulic pressure of the line pressure line 14 is supplied to the fourth friction member B1 by way of the fourth clutch valve 44.

At this time, since the hydraulic pressure is supplied to the first and second ports 162 and 166 of the N-R control valve 160 and the third solenoid valve S3 is controlled to be off, the second port 166 is communicated with the third port 168 by moving the valve spool of the N-R control valve 160 to the left, and therefore, the rear pressure is supplied to the sixth friction member B3.

Accordingly, when reverse shifting in reverse R range in such a condition as shown in FIG. 10 by the engagements of the second, fourth, and sixth friction members C2, B1, and B3, the shifting shock when transmitting is reduced by controlling the hydraulic pressure by the accumulator 320 when the hydraulic pressure is supplied from the manual valve 22 to the fourth friction member B1 through the fourth clutch valve 44.

A skip control down shifting when driving in D range makes the range shift from the 3-speed to the 1-speed and from the 4-speed to the 2-speed, and the operation is controlled by the 1-speed and 2-speed operations of the solenoid valve when the range is the 3-speed and 4-speed.

Figure 11:
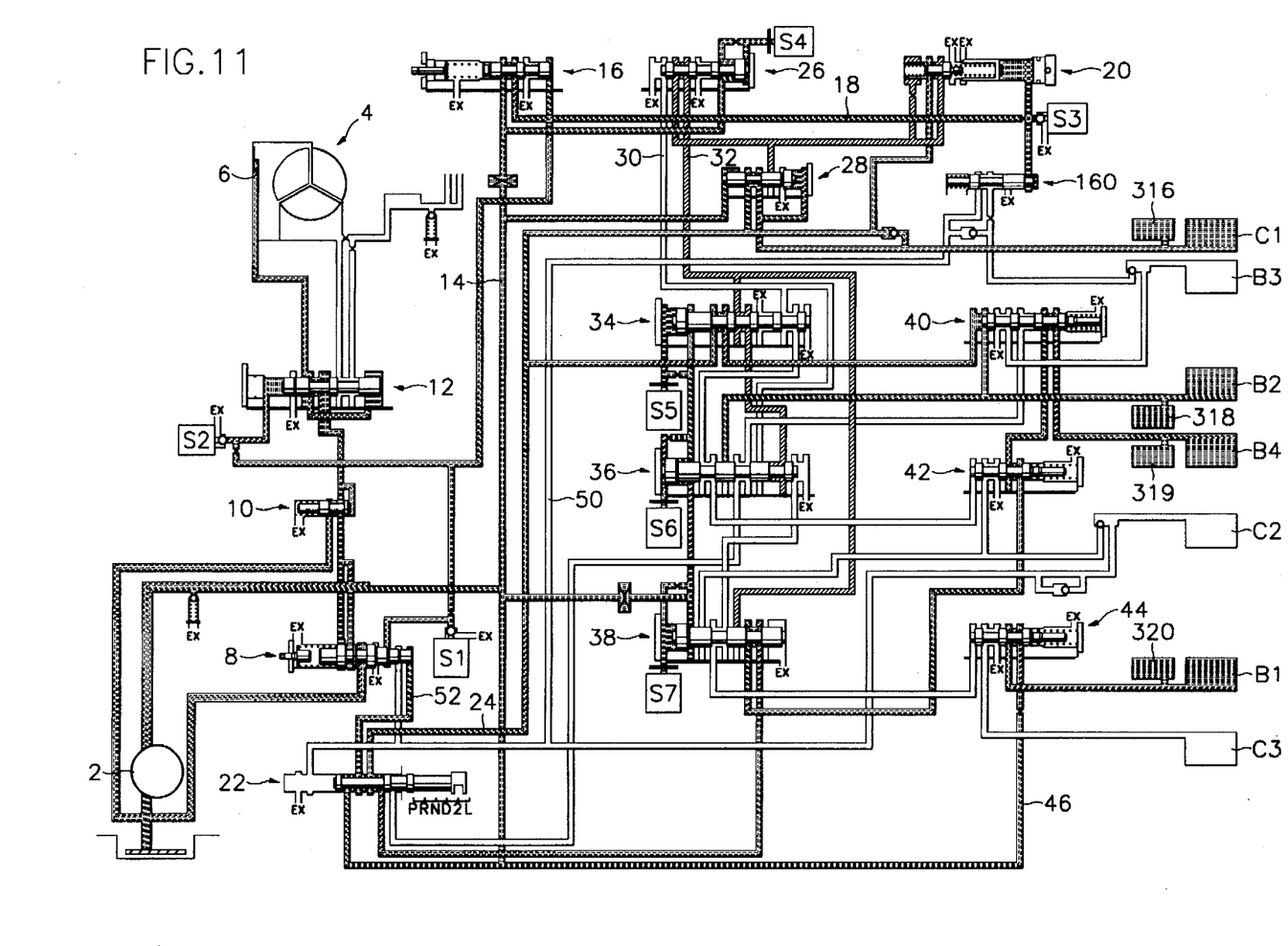
FIG. 11 is a view showing an operation shifting a range from a 4-speed D range to a 2-speed 2 range of the hydraulic control system in accordance with the embodiment of the present invention.

FIG. 11 is a circuit diagram of the hydraulic pressure when manual range shifting to the 2-speed 2 range by the selection of the driver in the 4-speed, and the first, second, third, and fifth friction members C1, C2, C3, and B2 are engaged in the 4-speed.

The hydraulic pressure supplied to the second and third friction members C2 and C3 is obstructed by controlling the sixth solenoid valve S6 to be from off to on when the shift selecting lever is set on 2 range in such a condition described above.

The torque pressure supplied from the torque control regulator valve 20 to the control switch valve 26 is supplied to the second torque pressure line 32 through the third port 130 when the third solenoid valve S3 is variably controlled and the fourth solenoid valve S4 is on.

The torque pressure is supplied to the seventh friction member B4 through the 3-4 shift valve 38, the third clutch valve 42, and the second clutch valve 40, and engages the seventh friction member B4, and then, the drive pressure supplied from the manual valve by off control of the seventh solenoid valve S7 is supplied to the seventh friction member B4. At the same time, part of the line pressure is supplied to the fourth friction member by moving the valve spool of the fourth clutch valve 44 to the left, and thereby engaging the fourth friction member.

The shifting shock generated when range shifting from the 4-speed D range to the 2-speed 2 range can be reduced by supplying the drive pressure from the manual valve 22 after the seventh friction member B4 is engaged by the torque pressure.

The line is indicated by ///// in FIG. 11 by reason that it is the line supplying the torque pressure to the seventh friction member B4 when initial manual range shifting to the 2-speed 2 range but not forming in the 2-speed D range.

Figure 12:
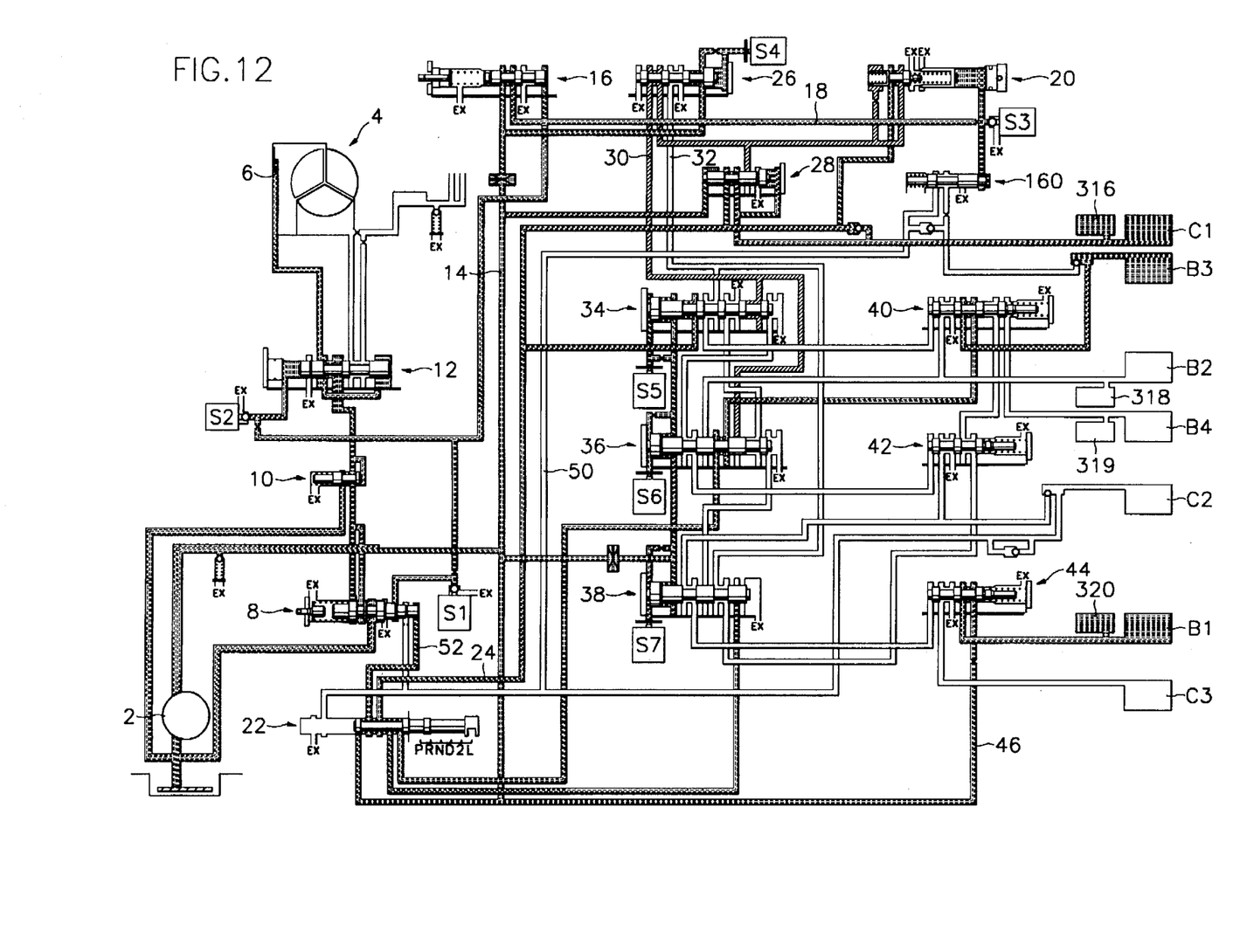
FIG. 12 is a view showing an operation of the shifting from a 3-speed D range to a 1-speed L range of the hydraulic control system in accordance with the embodiment of the present invention.

FIG. 12 is a view showing the operation shifting the range from the 3-speed D range to the 1-speed L range of the inventive hydraulic control system.

When range shifting from the 3-speed D range to L range by the shift selecting lever, the hydraulic pressure of the second friction member C2 and the fifth friction member B2 are obstructed by controlling the third solenoid valve S3 to be off and the fifth solenoid valve S5 to be on. At the same time, the range shifts to the 1-speed L range by controlling the engagement of the sixth friction member B3 by the torque pressure through the 2-3 shift valve 36 and the second clutch valve 40, and then the torque pressure is compensated by the drive pressure supplied from the manual valve 22 by controlling the sixth solenoid valve S6 to be on.

The line is indicated by ///// in FIG. 12 by reason that it is the line supplying the torque pressure to the sixth friction member B3 when initial manual range shifting to the 1-speed L range but not forming in the 1-speed D range.

The shifting quality of the inventive hydraulic control system is improved by controlling the seventh friction member by the torque pressure and the torque pressure is compensated by the drive pressure when manual range shifting from the 4-speed D range to 2 range.

The shifting quality thereof is improved by controlling the fourth friction member by the torque pressure and the torque pressure is compensated by the drive pressure supplied from the manual valve when range shifting from the 3-speed D range to the 1-speed L range.

The shifting shock can be minimized by controlling the hydraulic pressure supplied to the friction member in each transmitting stage by mounting the accumulators in the lines of the first, fourth, fifth, and seventh friction members.

What is claimed is:

1. A hydraulic control system of an automatic transmission for a vehicle, comprising:

pressure regulating means having a pressure regulating valve for changing hydraulic pressure supplied by an oil pump according to a vehicle driving condition;

torque pressure changing/supplying means having a solenoid supply valve, a torque control regulator valve, and a control switch, for changing line pressure supplied from said pressure regulating means into torque pressure and supplying it;

shift control means supplying the hydraulic pressure through a drive pressure line in a D range and through a rear pressure line in an R range by a manual valve cooperating with a shift selecting lever;

hydraulic pressure distributing means having a 1-2 shift valve, a 2-3 shift valve, a 3-4 shift valve, a second clutch valve, a third clutch valve, and a fourth clutch valve, for selecting and supplying the hydraulic pressure supplied from said shift control means by control of solenoid valves to the first, second, third, fourth, fifth, sixth, and seventh friction members; and a plurality of accumulators on a line supplying the hydraulic pressure to (a) the first friction member being engaged in a 1, 2, 3, 4-speed D range, (b) the fourth friction member being engaged in all transmitting stages except the 4-speed D range, (c) the fifth friction member being engaged in the 2, 3, 4-speed D range, and (d) the seventh friction member being engaged in the 2-speed 2 range of said hydraulic pressure distributing means.

2. The hydraulic control system according to claim 1, wherein the 1-2 shift valve supplies the torque pressure supplied from the torque pressure line and the drive pressure supplied from said manual valve to the fifth friction member through the second clutch valve with changing ports by on/off control of a solenoid valve controlling it when range shifting from the 1-speed to the 2-speed D range.

3. The hydraulic control system according to claim 1, wherein the 2-3 shift valve supplies the torque pressure supplied from said 1-2 shift valve and the part of the hydraulic pressure supplying to said third friction member to the second friction member through the third clutch valve and supplies the line through which the drive pressure and the torque pressure can pass from the manual valve when range shifting from the 3-speed D range to the 1-speed L range with changing the ports by on/off control of the solenoid valve controlling it when range shifting from the 2-speed to the 3-speed D range.

4. The hydraulic control system according to claim 1, wherein the 3-4 shift valve supplies the torque pressure supplied from said 2-3 shift valve and part of the hydraulic pressure supplying to said second friction member to the third friction member through the fourth clutch valve, at the same time, obstructs to supply the hydraulic pressure to said first friction member, and supplies the torque pressure supplied through the torque pressure line when range shifting from the 4-speed D range to the 2-speed 2 range to the seventh friction member through the third clutch valve and the second clutch valve with changing the ports by on/off control of the solenoid valve controlling it when range shifting from the 3-speed to the 4-speed D range.

5. The hydraulic control system according to claim 1, wherein the seventh friction member can be compensated by the drive pressure supplied from the manual valve after being controlled by the torque pressure when manual range shifting from the 4-speed D range to the 2-speed 2 range.

6. The hydraulic control system according to claim 1, wherein the sixth friction member can be compensated by the drive pressure supplied from the manual valve after being controlled by the torque pressure when manual range shifting from the 3-speed D range to the 1-speed L range.

* * * * *